July 11, 1933.   R. M. PREZ   1,917,852
SNAP FASTENER AND FASTENER INSTALLATION
Filed Feb. 21, 1930
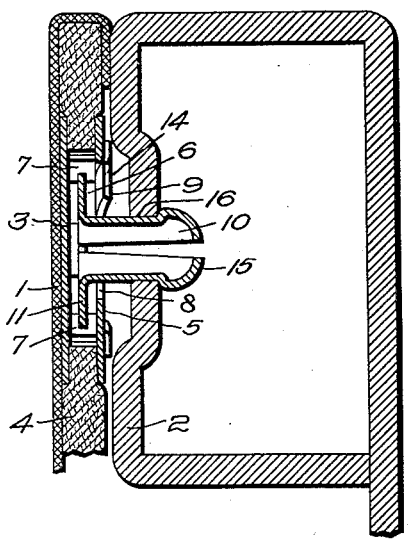
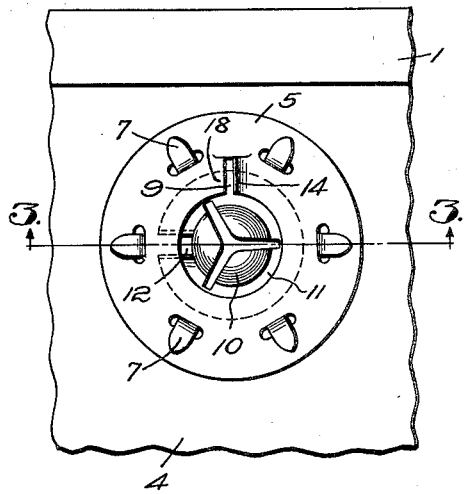
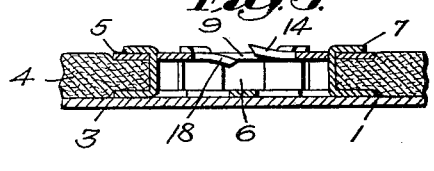
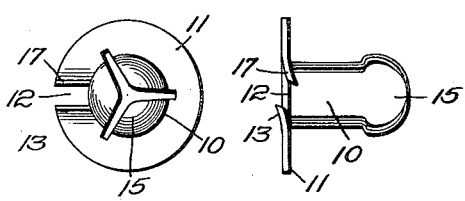
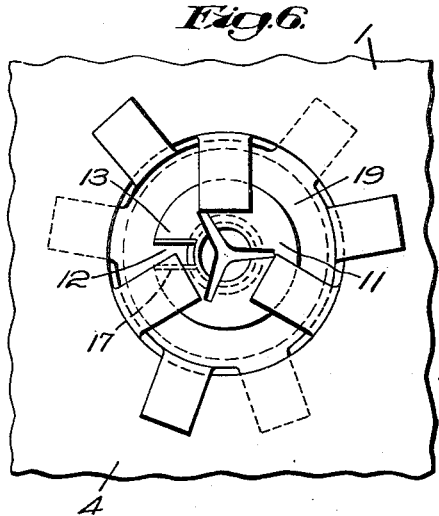
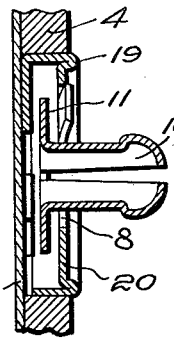
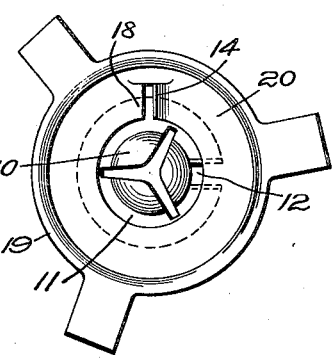
Inventor
Robert M. Prez
by Emery, Booth, Varney & Townsend Attys Patented July 11, 1933

1,917,852

UNITED STATES PATENT OFFICE

ROBERT M. PREZ, OF LANSING, MICHIGAN, ASSIGNOR TO UNITED-CARR FASTENER CORPORATION, OF CAMBRIDGE, MASSACHUSETTS, A CORPORATION OF MASSACHUSETTS

SNAP FASTENER AND FASTENER INSTALLATION

Application filed February 21, 1930. Serial No. 430,360.

My invention aims to provide improvements in snap fastener units and fastener installations particularly, though not exclusively adapted for use in connection with trimming and upholstery work.

Reference is hereby made to my divisional of this application Serial No. 581,161, filed December 15, 1931.

In the drawing which illustrates preferred embodiments of my invention:—

Figure 1 is a section through a portion of a metal frame and an upholstery panel showing also, in cross-section, my improved fastening unit;

Fig. 2 is an elevation view of a portion of the panel at the inner side showing a snap fastener unit attached thereto;

Fig. 3 is a section taken on the line 3—3 of Fig. 2, the snap fastener member being removed;

Figs. 4 and 5 are plan and side elevations, respectively, of the stud member of the fastener unit; and Figs. 6, 7 and 8 show various views of a fastener unit with a one-piece casing.

Referring first to the embodiment of my invention illustrated by the drawing, I have shown a fastener unit and fastener installation which is a decided improvement over that illustrated in United States Letters Patent No. 1,675,988, issued to Rollo F. Walters July 3, 1928. The device shown in that patent has been used to a large extent by motor vehicle manufacturers. However, there has been some objection to the type of fastener unit shown in the patent, because of the fact that the upholstery and trim panels are usually made at a point remote from the body assembly plant to which they are shipped. One objection is to the projecting studs which keep the panels spaced apart and, therefore, take up considerable excess space in shipment. Furthermore, the studs sometimes puncture other panels and in some instances the studs become crushed.

My invention is directed to the same general type of installation and fastening means as shown in the patent, but I have so constructed the elements of the fastener units that the studs do not have to be attached as parts of the installations until they are ready to be applied at the body assembly plant. The panels may be made complete and shipped in smaller packages, because they are not spaced apart and the snap fastener members are shipped separately. By using my fastener units, the panels cannot be damaged in transit by the studs.

Referring now to the specific embodiment of my invention illustrated by Figs. 1 through 5, I have shown a thin upholstered panel 1 secured to a frame 2 by means of snap fasteners all in a manner now well known in the art.

While I am aware that the attaching means or casings, which may be used in connection with my invention, may be made in various manners to permit engagement and disengagement of the studs after the panel elements have been assembled, I have selected and will describe one form of attaching means and one form of structure for effecting my invention.

The attaching means may be of any suitable construction and secured to the panel 1 in any desired manner, but I have shown a casing which includes a part 3 located at one side of the backing 4 of the panel 1 adjacent to an opening therethrough. A second part 5 comprising a part of the casing is located at the opposite side of the backing adjacent to the opening in the backing 4. Both parts 3 and 5 of the casing overlap the opening in the backing (Figs. 1 and 3) and provide a pocket 6 therebetween. The parts 3 and 5 are attached by means of prongs 7 passing from one part through the backing and engaging the other part.

The part 5, which is the part located at the inner face of the panel 1, has an aperture 8 therethrough and also a slot 9 extending radially outwardly from the aperture, as shown in Figs. 1, 2 and 3. The material at one longitudinal edge of the slot is bent downwardly and the material at the other longitudinal edge is bent upwardly, as shown in Fig. 3.

Any type of snap fastener member having a base may be assembled with the casing. In the drawing I have shown a well known type of stud 10 having a base 11 provided with a slot 12 extending from the edge of the base inwardly, as shown in Fig. 4. The base material along the longitudintl edges of the slot 12 is bent upwardly and downwardly respectively as shown.

A stud may be easily and quickly attached to and detached from the upholstery installation by placing its base 11 against the face of the part 5 and turning the stud in a clockwise direction. During the turning movement the downwardly turned portion 13 of the base 11 will engage beneath the upwardly turned portion 14 of the part 5 and the base will thereafter be screwed into the pocket 6. When thus assembled, the upholstery panel 1 may be attached to the frame 2 by pressing the stud head 15 through the aperture 16 in the frame 2, as shown in Fig. 1.

The stud is also shiftable in the casing in the same manner and for the same purpose as set forth in the patent referred to above.

To detach the stud from the casing it is merely necessary to pull on the stud and turn it in a contra-clockwise direction. This action will cause the upwardly turned portion 17 of the base 11 of the stud to pass over the downwardly turned portion 18 of the part 5, thereby unscrewing the stud.

In Figs. 6 through 7 I have shown a casing 19 which is made from a single piece of metal and which has a recess 20 in one face to assist in guiding the stud into engagement with the casing. Aside from these differences the casing is the same and receives and holds a stud in the same manner as the casing described in connection with Figs. 1 through 5.

While I have illustrated and described preferred embodiments of my invention, I do not wish to be limited thereby, as the scope of my invention is best defined by the following claims.

I claim:

1. A fastener unit comprising, in combination, an attaching part adapted to be secured in fixed relation to a supporting structure, a snap fastener member having a base assembled with said attaching part and having means for cooperative snap fastening engagement with another snap fastener member, interlocking means provided partly by the attaching part and partly by the snap fastener member whereby said snap fastener member may be assembled with and disassembled from the attaching part while it is secured to the supporting structure, and said interlocking means including a plate portion provided by the attaching part and having an aperture therethrough of fixed dimensions, and said base having a notch therein to permit engagement of the snap fastener member base beneath the plate portion only by relative rotation.

2. A fastener unit comprising, in combination, an attaching part having means for attaching it in fixed relation to a supporting structure, a snap fastener member assembled with said attaching part and having means for cooperative snap fastening engagement with another snap fastener element, interlocking means provided partly by the attaching part and partly by the snap fastener member whereby said snap fastener member may be assembled with and disassembled from the attaching part while it is secured to the supporting structure and a lost motion connection between the fastener member and the attaching part permitting transverse shifting of the fastener member relative to the attaching part for alignment with its cooperating snap fastener element.

3. A fastener unit comprising, in combination, an attaching part for attachment to a supporting structure, a snap fastener member assembled with said attaching part and means provided partly by the attaching part and partly by the fastener member whereby the attaching part may be attached to and detached from the fastener member by a screwing action, said attaching means comprising means providing a notched aperture in one face of the attaching part and a base on the fastener member having a notch extending inwardly from the outer periphery thereof, thereby to leave an edge adapted to enter the notch in the aperture provided by the attaching part as and for the purposes illustrated and described.

4. A fastener unit comprising, in combination, a casing part having means for attaching it to a support, a snap fastener part assembled with said casing part and means cooperating between the snap fastener part and the attaching part to permit engagement and disengagement of said parts by relative rotation, said means comprising a plate-like portion at one face of the casing part having an aperture therethrough and a base on said fastener part provided with a notch whereby said base may be screwed into and out of engagement beneath the plate-like portion of said casing part through the said aperture therein by relative rotation.

5. A fastener unit comprising, in combination, a casing part having means for attaching it to a support and having a notched aperture in one face thereof, a snap fastener member having a base slotted to provide the base with an entering edge for entrance into the notched part of the aperture thereby to permit engagement and disengagement of the base of the stud with the casing by turning movement while the casing is attached to a support.

In testimony whereof, I have signed my name to this specification.

ROBERT M. PREZ.